United States Patent [19]

Ito et al.

[11] Patent Number: 5,631,318
[45] Date of Patent: May 20, 1997

[54] REACTIVE HOT-MELT ELASTIC SEALANT COMPOSITION

[75] Inventors: Masahiro Ito, Mishima-gun; Masaharu Takada, Osaka, both of Japan

[73] Assignee: Sunstar Giken Kabushiki Kaisha, Takatsuki, Japan

[21] Appl. No.: 178,611

[22] Filed: Jan. 7, 1994

Related U.S. Application Data

[63] Continuation of Ser. No. 732,100, Jul. 18, 1991, abandoned.

[30] Foreign Application Priority Data

Jul. 25, 1990 [JP] Japan .................. 2-200683

[51] Int. Cl.$^6$ .................. C08J 3/00; C08K 3/20; C08L 75/00; C08G 18/00
[52] U.S. Cl. .................. 524/590; 524/589; 528/44; 528/59; 528/65; 528/66; 528/85
[58] Field of Search .................. 524/590, 589; 528/44, 59, 65, 66, 85

[56] References Cited

U.S. PATENT DOCUMENTS

| | | | |
|---|---|---|---|
| 3,813,380 | 5/1974 | Bock et al. | 528/66 |
| 4,985,491 | 1/1991 | Reisch | 524/875 |
| 4,985,535 | 1/1991 | Takada et al. | 524/272 |
| 5,039,418 | 8/1991 | Schucker | 523/461 |

FOREIGN PATENT DOCUMENTS

| | | |
|---|---|---|
| 0107097 | 5/1984 | European Pat. Off. . |
| 0244608 | 11/1987 | European Pat. Off. . |
| 0383505 | 8/1990 | European Pat. Off. . |
| 3938322 | 5/1990 | Germany . |

*Primary Examiner*—Patrick Niland
*Attorney, Agent, or Firm*—Foley & Lardner

[57] ABSTRACT

A reactive hot-melt elastic sealant composition which comprises as the main components (A) a polyurethane prepolymer which is prepared by reacting a polyether polyol having a hydroxyl group at the terminus and having a weight average molecular weight of 6,000 to 40,000 and an excess amount of a polyisocyanate compound, and (B) a themoplastic urethane multi-block copolymer resin, in admixture with conventional additives, which has excellent durability, cold resistance, initial adhesive force and maintenance of adhesive force for a long period of time and is useful particularly for adhesive seal of parts in automobiles.

4 Claims, No Drawings

REACTIVE HOT-MELT ELASTIC SEALANT COMPOSITION

This application is a continuation of U.S. application Ser. No. 07/732,100 filed Jul. 18, 1991 now abandoned.

This invention relates to a reactive hot-melt elastic sealant composition, more particularly, to a one-part part moisture-curing type, reactive hot-melt elastic adhesive sealant composition containing a polyurethane prepolymer and a thermoplastic urethane multi-block copolymer resin which has excellent durability, particularly excellent cold resistance (i.e. it shows rubber elasticity even at $-30°$ to $-40°$ C.) and further initial adhesive force and maintenance of adhesive force for a long period of time.

PRIOR ART

In the industry of automobile, it has recently been progressed to fix various parts surrounding windows and other parts by an adhesive, and the materials to be adhered have been changed from the conventional glass products and coated steel plates to plastic materials. The adhesive sealant, particularly for automobiles, requires to have excellent properties such as adhesion strength, durability which are not affected by the atmospheric temperature, that is being stable both at high temperature and under cold conditions (e.g. $-30°$ to $-40°$ C.) and further requires to have excellent initial adhesive force in order to avoid use of a specific means for temporary fixing. The adhesive sealant used for automobiles requires also to have excellent rubber elasticity for absorbing the vibrational energy during driving of automobiles.

The conventional hot-melt sealants comprising a thermoplastic resin as the main component are excellent in the initial adhesive force and worability, but they have some problems in less durability at high temperature because it softens at high temperature to result in lowering adhesive force and further in cold resistance because it becomes plastic-like under cold condition (e.g. at $-30°$ to $-40°$ C.) to lose the rubber elasticity. On the other hand, the conventional reactive sealants have excellent durability at a high temperature and also excellent cold resistance, but it has less initial adhesive force, that is, it requires disadvantageously a much longer time until the desired temporary adhesion is obtained. From this viewpoint, it has been studied to develope a sealant having both properties of the hot-melt sealant and those of the reactive sealant and also excellent temporary adhesive force, but it is very difficult to obtain a sealant having well balanced properties of initial adhesive force and elasticity. Particularly, in order to use the sealant under a cold condition (e.g. at $-30°$ to $-40°$ C.), it is very difficult to keep the elastomeric properties (rubber elasticity).

BRIEF DESCRIPTION OF THE INVENTION

Under the circumstances, the present inventors have intensively studied to obtain a reactive hot-melt elastic sealant having the desired initial adhesive force and the rubber elasticity even under cold condition as well as other required properties, and have found that the desired sealant can be obtained by combining a polyurethane prepolymer obtained by reacting a high molecular weight polyether polyol and an excess amount of polyisocyanate compound and a specific thermoplastic resin which is compatible with the polyurethane prepolymer and that the sealant satisfies the desired initial adhesive force, durability, particularly excellent rubber elasticity together with cold resistance at $-30°$ to $-40°$ C. in addition to the other desired properties as a hot melt sealant.

An object of the invention is to provide an improved reactive hot-melt sealant having excellent initial adhesive force and durability and further rubber elasticity even under cold condition. Another object of the invention is to provide a one part moisture-curing type, hot-melt adhesive sealant suitable for adhesive seal of parts in automobiles and other industrial fields, particularly for adhesive seal of parts surrounding windows of automobiles in cold district. These and other objects and advantages of the invention will be apparent to those skilled in the art from the following description.

DETAILED DESCRIPTION OF THE INVENTION

The reactive hot-melt elastic sealant composition of the invention comprises as the main components (A) a polyurethane prepolymer which is prepared by reacting a polyether polyol having a hydroxyl group at the terminus and having a weight average molecular weight of 6,000 to 40,000 (hereinafter occasionally referred to as "very high molecular weight polyether polyol") and an excess amount of a polyisocyanate compound, and (B) a thermoplastic urethane multi-block copolymer resin.

The very high molecular weight polyether polyol used in the present invention includes polyoxyalkylene ether polyols of the formula:

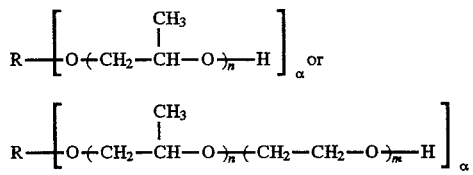

wherein R is a residue of a hydrocarbon group having 2 to 6 carbon atoms, particularly a straight chain or branched chain alkylene having 2 to 6 carbon atoms, n is an integer of 13 to 350, m is an integer of 0 to 440, and α is an integer of 2 to 8, preferably 2 to 4. Suitable examples of the polyether polyol are, for example, polyoxypropylenediol, polyoxypropylene-ethylenediol, polyoxypropylene triol, polyoxypropylene-ethylene triol, polyoxypropylenetetraol, polyoxypropylene-ethylenetetraol, and the like. Among these, preferred compounds have a weight average molecular weight of 6,000 to 40,000, more preferably 10,000 to 30,000, in view of the properties of the sealant product and workability thereof.

The above polyoxyalkylene ether polyols can be prepared by subjecting propylene oxide or propylene oxide-ethylene oxide to a ring opening polymerization in the presence of one or more of a polyhydroxyl compound of the formula:

$$R-(OH)_\alpha$$

wherein R and α are as defined above, and also in the presence of a conventional catalyst (e.g. a metallic catalyst).

The polyhydroxyl compound includes, for example, in case of α=2: ethylene glycol, diethylene glycol, propylene glycol, butylene glycol, or 1,6-hexanediol; in case of α=3: trimethylolpropane, triethylene triol, or 1,2,6-hexane-triol; in case of α=4: pentaerythritol; in case of α=6: sorbitol; in case of α=8: sucrose.

In the above reaction, butylene oxide may be used instead of propylene oxide (PO) or ethylene oxide (EO).

When the polyether polyol has a weight average molecular weight of less than 6,000, the sealant obtained therefrom has disadvantageously inferior elongation under cold condition (e.g. $-30°$ to $-40°$ C.) and has too high hardness, and on the other hand, the polyether polyol having a weight average weight average molecular weight of more than 40,000 is hardly obtainable by the available technique because too much by-products are produced, while the pure product has satisfactory properties. The very high molecular weight polyether polyol contains the funcitonal groups (OH value, i.e. the number of α) of 2 to 4, more preferably 2 to 3.

These very high molecular weight polyether polyols have a very low glass transition temperature (Tg) such as −70° to −60° C., and hence, when they are cured with a polyisocyanate compound, they can give the desired elastomeric properties under cold condition to the sealant. Polyols having a comparatively lower Tg, such as polybutadiene polyol or hydrogenated polybutadiene polyol are not practically used because they have inferior compatibility to the thermoplastic urethane multi-block copolymer resin.

The polyisocyanate compound used in the present invention includes any compounds used for the preparation of conventional urethane resins, for example, 2,4- or 2,6-tolylene diisocyanate, 4,4'-diphenylmethane diisocyanate (MDI), 1,3- or 1,4-xylylene diisocyanate, 1,5-naphthalene diisocyanate, isophorone diisocyanate, hexamethylene diisocyanate, tetramethylene diisocyanate, and trimethylolpropane adducts of the above polyisocyanate compounds, and the like, which are used alone or in combination of two or more thereof. In view of the moisture-curing rate, safety and cost, and the like, MDI is preferable.

The reaction of the very high molecular weight polyether polyol with an excess amount of the polyisocyanate compound is carried out under usual conidiions, for example, by heating at a temperature of 70° to 90° C. for 0.5 to 5 hours. The reaction components are used in an equivalent ratio of an isocyanate group/hydroxyl group (NCO/OH) of 1.5 to 3.5, preferably 2 to 3. When the ratio is less than 1.5, the polyurethane prepolymer thus prepared has significantly increased viscosity and extremely low heat stability at 70° to 80° C., and on the other hand, when the ratio is over 3.5, the polyurethane prepolymer tends to have significant foaming due to $CO_2$ generated during the moisture-curing while it has a good stability at 70° to 80° C.

The thermoplastic urethane multi-block copolymer resin used in the present invention is prepared by reacting a polyfunctional ring-containing and active hydrogen-containing compound, a diol or triol compound and an excess amount of a polyisocyanate compound. The polyfunctional ring-containing and active hydrogen-containing compound has usually a weight average molecular weight of 100 to 4,000, preferably 400 to 2,000, and includes, for example, bisphenol resins, terpene resins, coumarone resins, xylene resins, rosin ester resins, styrene resins, phenol resins, terpene phenol resins, rosin resins, polyester resins, and the like. The diol compound includes, for example, ethylene glycol, 1,4-butanediol, 1,6-hexanediol, 1,8-octanediol, polycarbonate diol, polytetramethylene glycol, hydrogenated butadienediol, polyacryldiol, polyoxyalkylene ether diol, polyoxyalkylene-adduct bisphenol, and other active hydrogen-containing compounds. The triol compound includes, for example, trimethylolpropane, glycerin, triethylene triol, polyoxyalkylene ether triol, and the like. The polyisocyanate compound includes all the above-mentioned compounds, but in view of increasing the aggregation energy of urethane and particularly safety and cost, MDI is the most preferable.

The thermoplastic urethane multi-block copolymer resins thus prepared are commercially available, for example, "Thermoplastic Resin Toyo Ace U-B" manufactured by K. Toyo Chemical Research Institute, which has a melting point of 70° to 100° C.

The thermoplastic urethane multi-block copolymer resin is effective for exhibiting the initial adhesive force of the sealant. Besides, the copolymer has urethane bond and ring compound residue in the molecule, by which the aggregation energy is exhibited and can show theromplastic properties. Moreover, since it has a polarity due to the ring compound residue and urethane bond, it can show good compatibility with the above polyurethane prepolymer.

The reactive hot-melt elastic sealant composition of the present invention is characteristic in that the above-mentioned polyurethane prepolymer and thermoplastic urethane multi-block copolymer resins are contained as the main components, but it can contain other conventional components in an appropriate amount. Preferable examples of the sealant composition of the present invention comprise 20 to 60% by weight, more preferably 30 to 50% by weight, of a polyurethane prepolymer; 5 to 30% by weight, more preferably 10 to 20% by weight, of the thermoplastic urethane multi-block copolymer resin; not more than 50%, more preferably 20 to 40% by weight, of a filler; and optionally not more than 20% by weight of a plasticizer and not more than 10% by weight of other additives.

When the content of the polyurethane prepolymer is less than 20% by weight, the product does not show the desired properties under cold condition (less elongation and too high hardness), and on the other hand, when the content is over 60% by weight, the product tends to have inferior workability. Besides, when the content of the thermoplastic urethane multi-block copolymer resin is less than 5% by weight, the product does not show the desired initial adhesive force, and on the other hand, when it over 30% by weight, the product tends to be not satisfactory in the properties under cold condition.

The filler includes silicic acid derivatives, talc, metal powders, calcium carbonate, clay, carbon black, and the like. When the filler is used in an amount of more than 50% by weight, the product has too high viscosity which is not suitable for use as a sealant and tends to have inferior adhesion and physical properties.

The plasticizer includes dibutyl phthalate, dioctyl phthalate, dicyclohexyl phthalate, diisooctyl phthalate, diisodecyl phthalate, dibenzyl phthalate, butyl benzyl phthalate, trioctyl phosphate, epoxy resin plasticizers, toluenesulfonamide, chloroparaffin, adipic acid esters, castor oil derivatives, and the like. When the plasticizer is used in an amount of more than 20% by weight, the product tends to have inferior adhesion and initial strength.

The other additives include solvents for adjusting the viscosity, curing catalysts, thixotropic agents (e.g. bentone, silicic anhydride, silicic derivatives, urea derivatives, etc.), dyes and pigments, ultraviolet absorbents, tackifiers, flame-retardants, silane compounds, dehydrating agents, and the like. When the other additives are used in an amount of more than 10% by weight, the product tends to be inferior in characteristics and physical properties as required for a sealant.

The composition of the present invention may be prepared, for example, by the following procedure.

Firstly, a thermoplastic urethane multi-block copolymer resin is molten at a temperature of 80° to 100° C. and the molten resin is charged into a nitrogen-replaceable vessel kept at about 90° C. To the vessel a polyurethane prepolymer is added under nitrogen atmosphere, and the mixture is stirred, and then a filler and optional plasticizer are added, and the mixture is defoamed with stirring under vacuum.

Thereafter, other additives such as a viscosity-adjusting solvent and a curing catalyst are further added, and the mixture is further defoamed with stirring under vacuum to give the desired composition.

The sealant composition of the present invention can be used for application at temperature of not higher than 80° C., preferably not higher than 70° C. Besides, in order to apply automatically (for example, by using a robot), it may be done by using a hot-melt applicator.

The present invention is illustrated by the following Example and Reference Example but should not be construed to be limited thereto.

EXAMPLE 1

(1) Preparation of Polyurethane Prepolymer

A polyoxypropylene-ethylene triol having a weight average molecular weight of 12,500 (X-8805, manufactured by Asahi Glass Co., Ltd., trifunctional, EO content 12% by weight, OH value 13.8) (2,000 g) is charged into a reaction vessel wherein air is replaced by nitrogen gas, and it is dried under vacuum (lower than 10 mmHg). After detecting and confirming that the moisture becomes lower than 0.05% by weight, 4,4'-diphenylmethane diisocyanate (MDI) (158 g) is added thereto (in the ratio of NCO/OH=2.61), and the mixture is reacted at 80°±5° C. for one hour. Thereafter, a 1% solution of dibutyl tin dilaurate (DBTDL) in xylene (1 g) is added to the mixture, and the mixture is reacted at the same temperature for 2 hours to give a polyurethane prepolymer having a free NCO content of 1.48% by weight, a viscosity of 24,000 cps/80° C. and 380,000 cps/20° C.

(2) Preparation of Sealant

To the polyurethane prepolymer obtained above (1) (400 g) is charged into a vessel with stirrer wherein air is replaced by nitrogen gas, and the temperature of the vessel is adjusted to 80°±10° C. Thereto is added a thermoplastic urethane multi-block copolymer resin (Thermoplastic resin Toyo Ace U-B, manufactured by K. K. Toyo Chemical Institute) (100 g), and the mixture is stirred at the same temperature for 20 to 30 minutes to dissolve the mixture. To the mixture are added carbon black (350 g) and calcium carbonate (100 g) which are previously dried, and the mixture is stirred for 30 minutes under vacuum (10 mmHg), and thereto are further added xylene (for adjusting the viscosity, 50 g) and a curing catalyst (a 1% solution of DBTDL in xylene, 0.3 g), and then the mixture is stirred to defoam under vacuum for 30 minutes. The reaction product is taken in a sealed aluminum-made cartridge. The sealant composition thus obtained is designated as "Sealant A-1".

In the same manner as described above (2) except that the thermoplastic urethane multi-block copolymer resin is used in an amount of 200 g (instead of 100 g), there is prepared a sealant composition which is designated as "Sealant A-2".

In the following examples, two kinds of sealant compositions are prepared likewise.

EXAMPLE 2

(1) Preparation of Polyurethane Prepolymer

A polyoxypropylene triol having a weight average molecular weight of 15,000 (X-8702, manufactured by Asahi Glass Co., Ltd., trifunctional, only PO, OH value 11) (2,000 g) and a polyoxypropylene-ethylene triol having a weight average molecular weight of 10,000 (X-8202D, difunctional, EO content 8% by weight, OH value 11) (1,000 g) are charged into a reaction vessel wherein air is replaced by nitrogen gas, and it is dried under vacuum (lower than 10 mmHg). After detecting and confirming that the moisture becomes lower than 0.05% by weight, MDI (200 g) is added thereto (in the ratio of NCO/OH=2.65), and the mixture is reacted at 80°±5° C. for one hour. Thereafter, a 1% solution of DBTDL in xylene (1 g) is added to the mixture, and the mixture is reacted at the same temperature for 2 hours to give a polyurethane prepolymer having a free NCO content of 1.28% by weight, a viscosity of 38,000 cps/80° C. and 460,000 cps/20° C.

(2) Preparation of Sealant

In the same manner and components as described above Example 1–(2) except that the polyurethane prepolymer obtained above (1) is used to give two sealant compositions "Sealant B-1" and "Sealant B-2".

EXAMPLE 3

(1) Preparation of Polyurethane Prepolymer

A polyoxypropylene triol having a weight average molecular weight of 30,000 (X-8705, manufactured by Asahi Glass Co., Ltd., trifunctional, only PO, OH value 6.1) (2,000 g) is charged into a reaction vessel wherein air is replaced by nitrogen gas, and it is dried under vacuum (lower than 10 mmHg). After detecting and confirming that the moisture becomes lower than 0.05% by weight, MDI (170 g) is added thereto (in the ratio of NCO/OH=2.75), and the mixture is reacted at 80°±5° C. for one hour. Thereafter, a 1% solution of DBTDL in xylene (1 g) is added to the mixture, and the mixture is reacted at the same temperature for 2 hours to give a polyurethane prepolymer having a free NCO content of 0.85% by weight, a viscosity of 21,000 cps/80° C. and 130,000 cps/20° C.

(2) Preparation of Sealant

In the same manner and components as described above Example 1–(2) except that the polyurethane prepolymer obtained above (1) is used to give two sealant compositions "Sealant C-1" and "Sealant C-2".

REFERENCE EXAMPLE 1

(1) Preparation of Polyurethane Prepolymer

A polyoxypropylene triol having a weight average molecular weight of 5,000 (X-5030, manufactured by Asahi Glass Co., Ltd., trifunctional) (3,000 g) is charged into a reaction vessel wherein air is replaced by nitrogen gas, and it is dried under vacuum (lower than 10 mmHg). After detecting and confirming that the moisture becomes lower than 0.05% by weight, MDI (546.5 g) is added thereto (in the ratio of NCO/OH=2.41), and the mixture is reacted at 80°±5° C. for one hour. Thereafter, a 1% solution of DBTDL in xylene (1 g) is added to the mixture, and the mixture is reacted at the same temperature for 2 hours to give a polyurethane prepolymer having a free NCO content of 3.01% by weight, a viscosity of 11,000 cps/80° C. and 31,000 cps/20° C.

(2) Preparation of Sealant

In the same manner and components as described above Example 1–(2) except that the polyurethane prepolymer obtained above (1) is used to give a sealant composition "Sealant D-1".

The polyurethane prepolymer obtained above (1) (500 g) is charged into a reaction vessel with stirrer wherein air is replaced by nitrogen gas, and thereto is added a dehydrated dioctyl phthalate (200 g), and the mixture is stirred for 10 minutes to dissolve it. To the mixture are added carbon black (400 g) and calcium carbonate (200 g) which are previously dried, and the mixture is defoamed with stirring for 30 minutes under vacuum (10 mmHg), and thereto are further added xylene (for adjusting the viscosity, 50 g) and a curing catalyst (a 1% solution of DBTDL in xylene, 0.3 g), and then the mixture is stirred to defoam under vacuum for 30 minutes. The reaction product is taken in a sealed aluminum-made cartridge. The sealant composition thus obtained is designated as "Sealant D-2".

REFERENCE EXAMPLE 2

(1) Preparation of Polyurethane Prepolymer

A polyoxypropylene triol having a weight average molecular weight of 5,000 (trifunctional) (2,000 g) and a polyoxypropylene glycol having a molecular weight of 2,000 (difunctional) (1,000 g) are charged into a reaction vessel wherein air is replaced by nitrogen gas, and it is dried under vacuum (lower than 10 mmHg). After detecting and confirming that the moisture becomes lower than 0.05% by weight, MDI-(608 g) is added thereto (in the ratio of NCO/OH =2.19), and the mixture is reacted at 80°±5° C. for one hour. Thereafter, a 1% solution of DBTDL in xylene (1 g) is added to the mixture, and the mixture is reacted at the same temperature for 2 hours to give a polyurethane prepolymer having a free NCO content of 3.1% by weight, a viscosity of 18,000 cps/80° C. and 45,000 cps/20° C.

(2) Preparation of Sealant

In the same manner and components as described in the above Example 1–(2) except that the polyurethane prepolymer obtained above (1) is used to give a sealant composition "Sealant E-1".

In the same manner and components as described in the above Reference Example 1–(2) except that the polyurethane prepolymer obtained above (1), there is prepared a sealant composition "Sealant E-2".

TEST OF ADHESION

Each sealant composition obtained in Examples 1 to 3 and Reference Examples 1 to 2 were subjected to the following tests, and the results are shown in Table 1.

(1) Test of Initial Adhesion Strength (Shear Strength)

The sealant to be tested (molten at 80° C) was applied to a steel panel (width 25 mm, length 100 mm, thickness 0.8 mm) in an area of 10 mm from the tip of the panel in a thickness of 5 mm under the condition of 20° C., 65% relative humidity (RH), and thereon a glass plate (width 25 mm, length 50 In, thickness 5 m) was pilad, and after keeping the test piece for 10 minutes, the adhesion strength ($kg/cm^2$) was measured at a pulling rate of 50 mm/min. or 200 mm/min. The results are shown in Table 1-1.

(2) Test of Elastomeric Properties

Th sealant composition to be tested (molten at 80° C.) was applied to a release paper in a thickness of 2 mm, and then cured at 20° C. under 65% RH for 168 hours.

The test was carried out in the same manner as defined in JIS K 6301, Dumbbell test, there were measured the elongation (%), tensile strength (T.S) ($kg/cm^2$) and hardness (Shore A) under various atmospheric conditions such as ordinary state (20° C., 65% RH), under cold condition (−30° C.) or with heating (80° C). The results are shown in Table 1—1.

(3) Adhesion Strength at Cured State (Shear Strength)

In the same manner as in the above test (1), a steel panel and a glass plate was adhered under the atmosphere of 20° C., 65% RH [wherein the glass plate was previously coated with a primer (Primer #435-40, manufactured by Sunstar Giken K. K.), and the steel panel was previously coated with a primer (Primer #435-95, manufactured by Sunstar Giken K. K.)]. The resulting test piece was kept at room temperature for 7 days to complete the moisture-curing, and then there was measured the shear strength ($kg/cm^2$) at a pulling rate of 50 mm/min. under the same atmospheric conditions as in the above test (2). The results are shown in Table 1–2, wherein CF means cohesive failure of the sealant and AF means adhesive failure between the primer and sealant.

TABLE 1-1

| | (1) Initial adhesion strength ($kg/cm^2$) | | (2) Elastomeric properties at ordinary state (20° C., 65% RH) | | | (2) Elastromeric properties | | | | | |
| | | | | | | under cold temperature (−30° C.) | | | with heating (80° C.) | | |
| Examples | 50 mm/min. | 200 mm/min. | Elongation (%) | T.S ($kg/cm^2$) | Hardness | Elongation (%) | T.S ($kg/cm^2$) | Hardness | Elongation (%) | T.S ($kg/cm^2$) | Hardness |
| Example 1: | | | | | | | | | | | |
| Sealant A-1 | 0.37 | 0.58 | 700 | 64.0 | 56 | | | | | | |
| Sealant A-2 | 0.49 | 0.87 | 650 | 68.5 | 58 | 350 | 71.8 | 68 | 725 | 46.9 | 47 |
| Example 2: | | | 300 | 76.9 | 72 | 700 | 44.8 | 44 | | | |
| Sealant B-1 | 0.36 | 0.54 | 700 | 61.8 | 55 | | | | | | |
| Sealant B-2 | 0.43 | 0.85 | 600 | 65.4 | 57 | 350 | 69.8 | 65 | 750 | 47.7 | 48 |
| Example 3: | | | 325 | 75.4 | 70 | 675 | 46.7 | 45 | | | |
| Sealant C-1 | 0.31 | 0.49 | 800 | 57.0 | 54 | | | | | | |
| Sealant C-2 | 0.42 | 0.74 | 750 | 59.5 | 56 | 400 | 65.4 | 64 | 800 | 48.1 | 45 |
| Ref. Example 1: | | | 375 | 69.8 | 68 | 725 | 47.1 | 42 | | | |
| Sealant D-1 | 0.31 | 0.52 | 300 | 68.0 | 63 | | | | | | |

TABLE 1-1-continued

| | (1) Initial adhesion strength (kg/cm²) | | (2) Elastomeric properties at ordinary state (20° C., 65% RH) | | | (2) Elastomeric properties under cold temperature (−30° C.) | | | (2) Elastomeric properties with heating (80° C.) | | |
|---|---|---|---|---|---|---|---|---|---|---|---|
| Examples | 50 mm/min. | 200 mm/min. | Elongation (%) | T.S (kg/cm²) | Hardness | Elongation (%) | T.S (kg/cm²) | Hardness | Elongation (%) | T.S (kg/cm²) | Hardness |
| Sealant D-2 | 0.06 | 0.09 | 600 | 51.5 | 50 | 150 | 85.0 | 84 | 400 | 44.1 | 45 |
| Ref. Example 2: | 325 | 69.9 | 71 | 600 | 41.1 | | | 41 | | | |
| Sealant E-1 | 0.34 | 0.57 | 350 | 65.0 | 61 | | | | | | |
| Sealant E-2 | 0.04 | 0.08 | 700 | 54.8 | 51 | 150 | 82.8 | 88 | 350 | 47.1 | 44 |

TABLE 1-2

| | (3) Shear strength (kg/cm²) | | |
|---|---|---|---|
| Examples | at ordinary state (20° C., 65% RH) | Under cold condition (−30° C.) | with heating (80° C.) |
| Example 1: | | | |
| Sealant A-1 | 61.8 CF | 68.9 CF | 45.8 CF |
| Sealant A-2 | 65.4 CF | 71.9 CF | 41.4 CF |
| Example 2: | | | |
| Sealant B-1 | 62.8 CF | 69.1 CF | 46.9 CF |
| Sealant B-2 | 63.9 CF | 73.2 CF | 43.8 CF |
| Example 3: | | | |
| Sealant C-1 | 59.1 CF | 64.1 CF | 43.4 CF |
| Sealant C-2 | 61.1 CF | 66.9 CF | 41.1 CF |
| Ref. Example 1: | | | |
| Sealant D-1 | 71.1 CF | 84.0 AF | 49.4 CF |
| Sealant D-2 | 56.4 CF | 68.8 CF | 43.1 CF |
| Ref. Example 2: | | | |
| Sealant E-1 | 70.8 CF | 81.9 AF | 46.9 CF |
| Sealant E-2 | 55.8 CF | 67.8 CF | 44.8 CF |

What is claimed is:

1. A reactive hot-melt elastic sealant composition comprising:

(A) a first component consisting essentially of a polyurethane prepolymer which is prepared by reacting a polyether polyol having a hydroxyl group at the terminus and having a weight average molecular weight of 6,000 to 40,000 and an excess amount of a polyisocyanate compound, and (B) a second component comprising a thermoplastic urethane multi-block copolymer resin, which is prepared by reacting (a) a polyfunctional ring-containing and active hydrogen-containing compound having a weight average molecular weight of 100 to 4,000 selected from the group consisting of a bisphenol resin, a terpene resin, a coumarone resin, a xylene resin, a rosin ester resin, a styrene resin, a phenol resin, a terpene phenol resin, and a rosin resin, (b) a diol or triol compound selected from the group consisting of ethylene glycol, 1,4-butanediol, 1,6-hexanediol, 1,8-octanediol, a polycarbonate diol, a polytetramethylene glycol, a polyacryldiol, a polyalkylene ether diol, a polyoxyalkylene-adduct bisphenol, trimethylolpropane, glycerin, triethylene triol, and a polyoxyalkylene ether triol, and (c) an excess amount of a polyisocyanate compound, wherein the reactive hot-melt elastic sealant composition contains 20 to 60% by weight of the polyurethane prepolymer, 5 to 30% by weight of the thermoplastic urethane multi-block copolymer resin, not more than 50% by weight of a filler, not more than 20% by weight of a plasticizer and not more than 10% by weight of other additives, and the first component is different from the second component.

2. The sealant composition according to claim 1, which comprises 30 to 50% by weight of the polyurethane prepolymer, 10 to 20% by weight of the thermoplastic urethane multi-block copolymer resin, 20 to 40% by weight of a filler, not more than 20% by weight of a plasticizer, and not more than 10% by weight of other additives.

3. The sealant composition according to claim 1, wherein the polyurethane prepolymer is prepared by reacting the polyether polyol and the polyisocyanate compound in an equivalent ratio of NCO/OH of 1.5 to 3.5.

4. The sealant composition according to claim 1, wherein the polyether polyol is a polyoxyalkylene ether polyol of the formula:

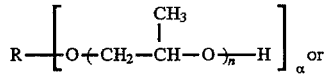

or

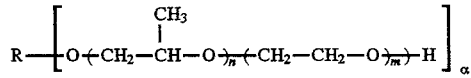

wherein R is an alkylene having 2 to 6 carbon atoms, n is an integer of 13 to 350, m is an interger of 0 to 440, and α is an integer of 2 to 8.

* * * * *